United States Patent [19]

Mishler

[11] Patent Number: 4,709,940
[45] Date of Patent: Dec. 1, 1987

[54] STORAGE APPARATUS FOR HITCH AND HITCH TORSION BARS WHEN NOT IN USE

[76] Inventor: Jack L. Mishler, 6607 Avenue 396, Dinuba, Calif. 93618

[21] Appl. No.: 922,209

[22] Filed: Oct. 23, 1986

[51] Int. Cl.⁴ .............................................. B60D 1/14
[52] U.S. Cl. ............................ 280/405 R; 280/491 E; 280/495
[58] Field of Search ................... 280/501, 491 E, 495, 280/406 A, 504, 507, 405 R, 500 A

[56] References Cited

U.S. PATENT DOCUMENTS

| 3,347,562 | 10/1967 | Bolyard | 280/406 A |
| 3,768,837 | 10/1973 | Reese | 280/495 |
| 4,050,714 | 9/1977 | Epp | 280/495 |
| 4,438,945 | 3/1984 | Curtis | 280/501 |
| 4,540,194 | 9/1985 | Dane | 280/491 B |
| 4,614,353 | 9/1987 | Mayer | 280/405 |

Primary Examiner—John J. Love
Assistant Examiner—Donn McGiehan
Attorney, Agent, or Firm—Worrel & Worrel

[57] ABSTRACT

A storage apparatus for a hitch and hitch torsion bars when not in use the apparatus having a hitch receiving member; a pair of spring receiving members affixed on the outside surface of the hitch receiving member; and a pair of pivotally mounted doors adapted to engage and capture a pair of spring bars in secure mating relationship internally of the spring receiving member when a detachable hitch assembly is secured in mating relationship with the hitch receiving member to prevent the theft or removal thereof.

10 Claims, 5 Drawing Figures

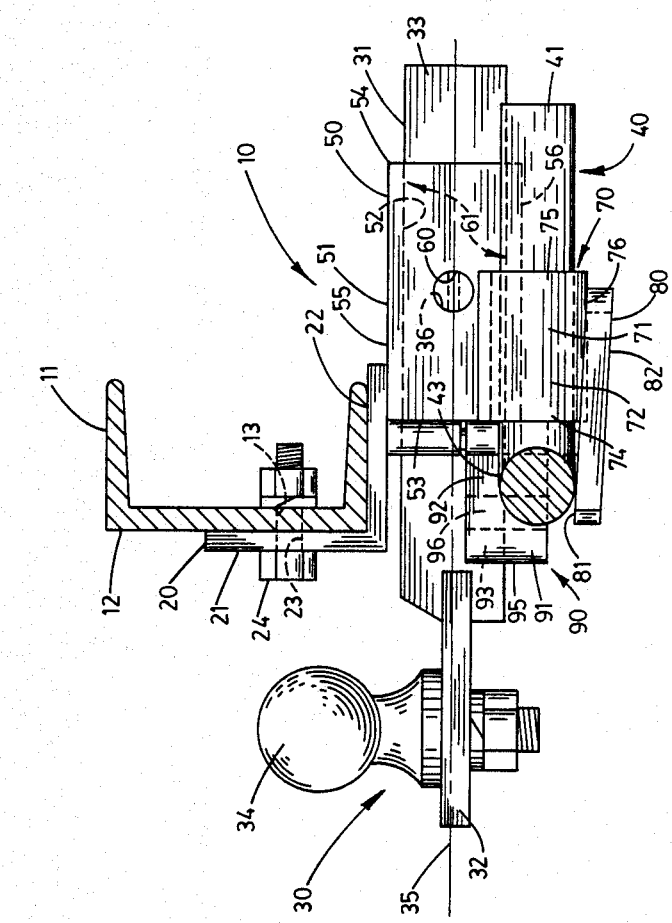
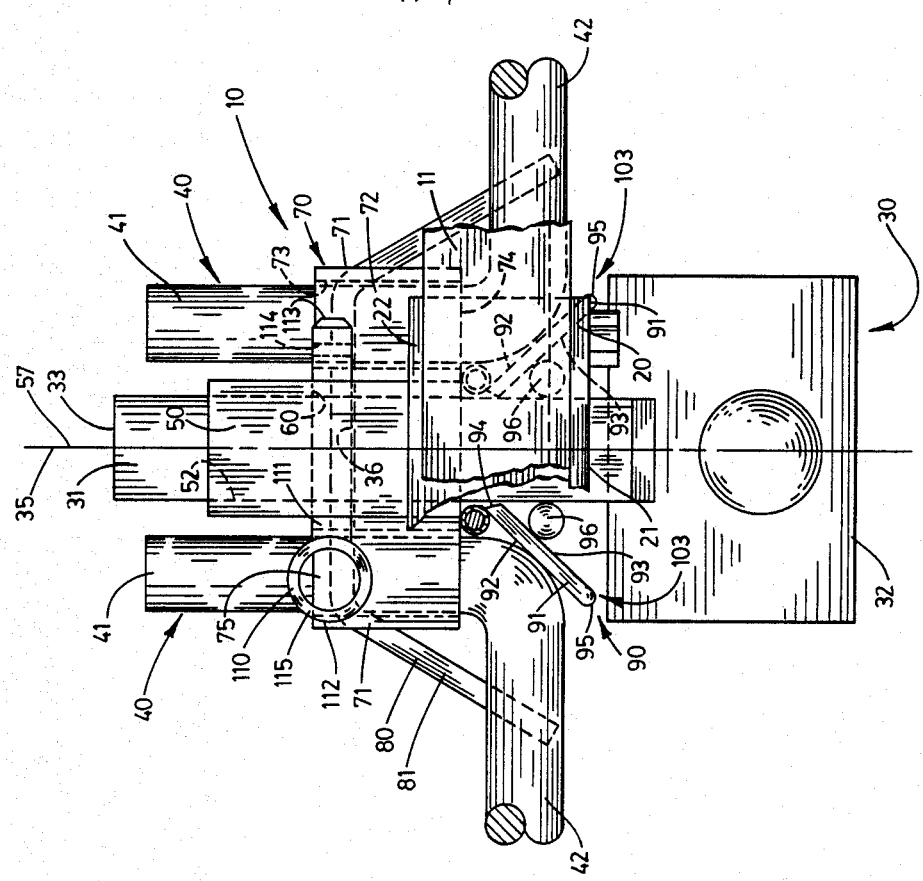
FIG. 5
FIG. 4

STORAGE APPARATUS FOR HITCH AND HITCH TORSION BARS WHEN NOT IN USE

BACKGROUND OF THE INVENTION

1. Field of the Invention

The present invention relates to a storage apparatus for hitch and hitch torsion bars when not in use and more particularly, to such an apparatus which is relatively inexpensive to construct and maintain, and which affords the optimum conditions for securing the hitch and hitch torsion bars in virtually any operative environment.

2. Description of the Prior Art

The security and storage of the components of a hitch assembly for the purposes of preventing theft and/or damage to the components thereof, have long plagued recreational vehicle owners.

As should be appreciated, hitch assemblies assume various operational configurations, but as a general matter, they characteristically have a mounting tube that is substantially rectangular in cross section, and which is mounted securely in a predetermined attitude underneath the towing vehicle. The mounting tube is adapted to receive a detachable hitch assembly, or tow bar that has a coupling member, which mounts a hitch ball at its distal end. In some situations, due in part to the weight of the towed vehicle; angulated spring bars or hitch torsion bars are employed as one of the component elements of the hitch assembly. As should be understood, these spring bars are expensive to purchase, and are therefore occasionally the subject of theft or damage when they are not utilized with the hitch assembly. The spring bars, in addition to being somewhat bulky and awkward in size, are often coated, or otherwise substantially covered with various lubricants and grease, and are therefore undesirable to handle, or inconvenient to store in the various storage areas of the towing vehicle.

The owners of recreational vehicles have approached the problem of securing these spring bars or hitch torsion bars by typically placing the spring bars in the trunks of the towing vehicles or otherwise securing them in various other storage areas of the towed vehicle. This, however, has proven to be an unsatisfactory answer inasmuch as the individual spring bars frequently soil the surrounding surfaces where they are stored and secured. It is generally the case, therefore, that the spring bars are not secured in any area, and are consequently the subject of theft or damage.

Therefore, it has long been known that it would be desirable to have an improved storage apparatus for a hitch and hitch torsion bars which is adapted to be mounted on a suppporting structure; the apparatus securing the hitch and hitch torsion bars in mating relationship on the supporting structure thus preventing theft or damage; and which is readily removable for maintenance after installation; the apparatus being both inexpensive to manufacture and sell and characterized by a compact deployed configuration.

SUMMARY OF THE INVENTION

Therefore, it is an object of the present invention to provide an improved storage apparatus for hitch and hitch torsion bars when not in use.

Another object is to provide such an apparatus which mounts a detachable hitch or hitch assembly and a pair of spring bars in secure mating relationship to a supporting structure to prevent theft and/or damage.

Another object is to provide such an apparatus which is readily adaptable to be secured to virtually any supporting structure on a towed vehicle, and which is uniquely well suited to adaptation to the particular structural requirements of the towed vehicle selected for such installation.

Another object is to provide such an apparatus which is so constructed that it is easily released from the surface of the supporting structure upon which it is mounted for purposes of maintenance, modification, and the like.

Another object is to provide such an apparatus which is characterized by an ease of installation, simplicity of construction, and which can be sold and installed at nominal expense.

Another object is to provide such an apparatus which is so constructed that the threat of damage or theft to the detachable hitch assembly and the pair of spring bars is substantially eliminated.

Another object is to provide such an apparatus which is adapted to be constructed so as to conform to the configuration of the spring bars, and which can detachably secure the spring bars in secure mating relationship with the apparatus.

Another object is to provide such an apparatus which does not obstruct the towed vehicle on which it is mounted so that the vehicle can be driven or otherwise operated while the device is so deployed.

Further objects and advantages are to provide improved elements and arrangements thereof in an apparatus for the purposes described which is dependable, economical, durable, and fully effective in accomplishing its intended purposes.

BRIEF DESCRIPTION OF THE DRAWINGS

FIG. 4 is a top plan view of the apparatus of FIG. 1 showing a pair of spring bars or hitch torsion bars and a detachable hitch assembly deployed in mating engagement with the device, and the pivotally mounted doors positioned in a closed attitude.

FIG. 5 is a side elevational view of the apparatus of FIG. 4 showing an individual spring bar or hitch torsion bar and the detachable hitch assembly deployed in mating engagement with the apparatus, and the pivotally mounted doors positioned in a closed attitude.

DESCRIPTION OF THE PREFERRED EMBODIMENT

Figures 1, 2, 3:
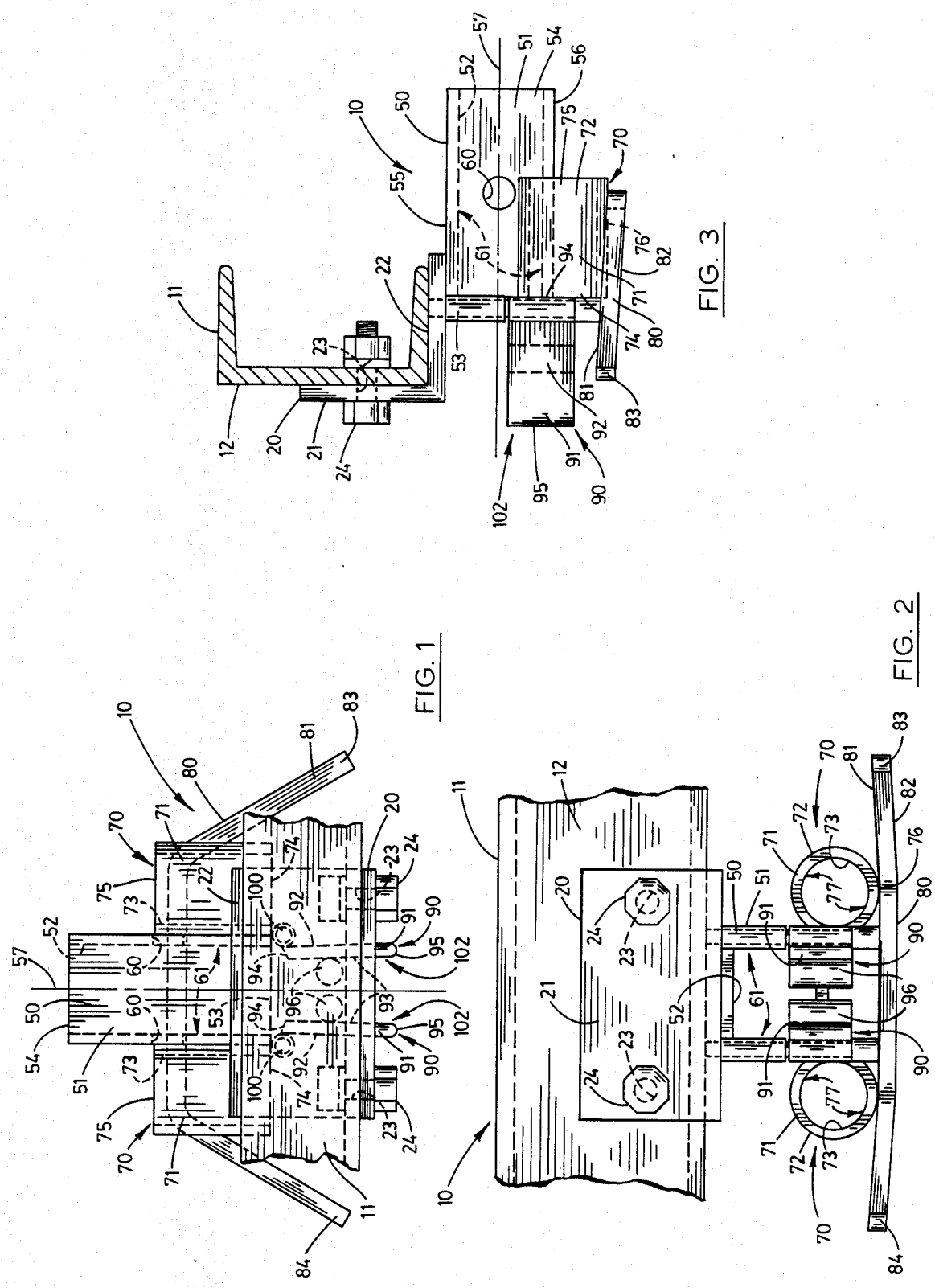
FIG. 1 is a top plan view of the apparatus of the subject invention showing the pivotally mounted doors positioned in an open attitude.
FIG. 2 is a front elevational view of the apparatus of the subject invention showing the pivotally mounted doors positioned in an open attitude.
FIG. 3 is a side elevational view of the apparatus of the subject invention showing the pivotally mounted doors positioned in an open attitude.

Referring more particularly to the drawings, the storage apparatus for hitch and hitch torsion bars when not in use embodying the principles of the present invention is designated generally by the numeral 10 in FIG. 1.

As shown in FIGS. 2 and 3 for illustrative convenience, the apparatus 10 is mounted on a supporting structure 11, herein illustrated as an appropriately dimensioned structural beam which is a component element of a towed overland vehicle (not shown). The towed overland vehicle as can best be imagined, is of conventional construction having ground engaging wheels (not shown), that are suitably interconnected to the supporting structure 11. The supporting structure is manufactured out of an appropriately dimensioned standard gauge steel beam which has a mounting surface 12, which has formed therein a plurality of orifices 13. As should be understood, the towed overland vehicle is attached to a towing vehicle (not shown), and thus is propelled over the surface of the earth.

The apparatus 10 is deployed in an appropriate predetermined attitude on the supporting structure 11 by a mount 20. The positioning of the apparatus on the towed overland vehicle (not shown) is not particularly critical, however, it should be understood that it should be deployed in a position whereby it will not interfere with the use of the towed vehicle when it is not being towed. Furthermore, it should be positioned in an area which is conveniently accessible for usage; but will not thereafter impede the operation of the towed vehicle when it is being employed in towing operations. The mount, which is illustrated as being a short section of angle iron beam or the like, has a vertically oriented surface 21, and a horizontally oriented surface 22. As should be understood, a plurality of mounting holes 23 are formed into the vertically oriented surface and are positioned to be in registry with the orifices 13 which are formed in the mounting surface 12 of the supporting structure 11. The mount is secured to the supporting structure by a suitable number of bolts and nuts 24.

The apparatus 10 is adapted to mount a detachable hitch assembly or hitch generally indicated by the numeral 30. As best illustrated by reference to FIG. 5, the hitch assembly 30 has, as one of its component parts, an elongated substantially rectangular shaped tow bar 31. The tow bar, which is of conventional configuration, has a first end 32; and an opposed second end 33. As illustrated, the first end of the rectangular tow bar mounts a standard dimensioned hitch ball 34. The rectangularly shaped tow bar has a longitudinal axis 35; and has formed in close proximity to the second end 33, a channel 36, which is positioned transversely of the longitudinal axis and extends therethrough.

As seen most clearly by reference to FIG. 4, the apparatus 10 is adapted to receive and deploy a pair of spring bars or hitch torsion bars which are generally indicated by the numeral 40. The spring bars, which are substantially L-shaped in configuration, have a first end 41 and an opposed second end 42. The spring bars are manufactured out of materials which are well understood in the art and are therefore, for the sake of brevity, not discussed in any detail here. However, it should be understood that the spring bars have an exterior surface 43, which is usually coated with a lubricant; and are substantially circular in cross-sectional dimension. This is best seen by reference to FIG. 5.

The mount 20 is affixed in substantially facing engagement to a hitch receiving member 50, by a suitable weld or other fastener (not shown). As best seen by reference to FIGS. 1 and 2, the hitch receiving member is substantially rectangular in shape and is dimensioned slidably to receive and closely hold the hitch assembly 30. The hitch receiving member has an outside surface 51, an inside surface 52, a first end 53, and an opposed second end 54. The mount also is affixed by a suitable weld or other fastener (not shown), to the top surface 55. The hitch receiving member also has a lower surface 56; and a longitudinal axis generally indicated by the numeral 57.

As best seen by reference to FIGS. 1 and 3, a pin receiving station 60 is formed in the outside surface 51 and is disposed such that it will be in registry with the channel 36, which is formed in the rectangularly shaped tow bar 31 when the tow bar is received in mating engagement with the hitch receiving member 50. As best understood by reference to FIG. 2, the hitch receiving member defines a channel 61 which is conformably dimensioned to slidably receive the hitch or hitch assembly in secure mating relationship, and which is adapted to deploy the hitch assembly in a fixed attitude on the supporting structure 11.

Mounted in an appropriate attitude on the outside surface 51 of the hitch receiving member 50 is a pair of spring receiving members 70. The spring receiving members are mounted in close proximity to the lower surface 56; in a substantially parallel attitude to the longitudinal axis 57; and closely adjacent to the first end 53. The spring receiving members are conformably adapted to slidably receive and deploy the spring bars or hitch torsion bars 40 in a predetermined attitude. As should be understood the spring receiving members 70 have a substantially cylindrical main body 71 which has an exterior surface 72; an interior surface 73; a first end 74; and an opposed second end 75. The spring receiving members also have a lower surface 76. The interior surface 73 defines a channel 77 which is adapted to receive and deploy the spring bars. This is best illustrated by reference to FIG. 5. As should be understood, the first end 41 of the spring bars 40 is slidably received internally of the channel 77 of the spring receiving member 70.

As best understood by reference to FIGS. 1 and 2, an angulated brace 80 is provided, which positions the spring bars or hitch torsion bars 40 in a predetermined attitude with respect to the supporting structure 11, when the spring bars are slidably received internally of the spring receiving members 70. The angulated brace, which is welded or otherwise secured to the lower surface 76, of the spring receiving members, has a top surface 81, which is attached in facing engagement with the lower surface 76 of the spring receiving members; and an opposed bottom surface 82. The angulated brace has opposed ends indicated by the numerals 83, and 84, respectively. As best appreciated by a study of FIGS. 1 and 4, the opposed ends 83 and 84 engage, and thereafter cause the positioning of the spring bars in a secure predetermined attitude closely adjacent to the supporting structure 11, and in spaced relationship from the surface of the earth (not shown).

A pair of pivotally mounted doors generally indicated by the numeral 90 are mounted on the hitch receiving member 50, adjacent to both the first end 53 of the hitch receiving member 50, and to the first end 74 of the spring receiving members 70. The pair of pivotally mounted doors each have a door panel 91 which is manufactured out of steel or the like. Each door panel further has an inside surface 92; an outside surface 93; an inside edge 94; and an outside edge 95. The pivotally mounted doors each deploy a locking member 96 which is affixed to the outside surface 93 in an attitude closely adjacent to the inside edge 94.

Affixed to the inside surface 92 of the pivotally mounted doors 90 and also attached to the outside surface 51, at the first end 53 of the hitch receiving member 50, is a hinge 100. The hinge 100 permits the pivotally mounted doors 90 to have a predetermined path of travel, which can best be understood by a study of FIGS. 1 and 4. As illustrated therein, the pivotally mounted doors are positioned in the open attitude 102; and in FIG. 4, the pivotally mounted doors are deployed in the closed attitude 103 securely to capture the spring bars or hitch torsion bars 40 in secure mating relationship with the spring receiving members 70. As should be appreciated the opened attitude permits the spring bars 40 to be slidably received in internal mating engagement with the spring receiving members 70. It should be understood that each of the door panels 91 cannot be positioned in the opened attitude if the hitch assembly 30 is mounted in receiving engagement with the hitch receiving member 50. The door panel is movable to, and secured in the closed attitude 103, by the locking member 96 which rests in engagement with the rectangularly shaped tow bar 31 when it is received in the rectangular chamber 61, of the hitch receiving member 50. This relationship is clearly illustrated by reference to FIG. 4. As should be appreciated, the door panels must be positioned in the closed attitude, to permit the detachable hitch assembly 30 to be slidably received into the rectangular channel 61, which is formed by the inside surface 52 of the hitch receiving member 50.

The apparatus 10 has a locking pin generally indicated by the numeral 110, which has a cylindrical main body 111; a first end 112; and a second end 113. Formed in an appropriate manner, in close proximity to the second end, is an orifice 114 which is adapted to receive the hasp member of an appropriate lock (which is not shown). A suitable finger grip 115 is formed in the first end of the locking pin; the finger grip permits an operator to insert a finger or the like for the purpose of withdrawing the locking pin out of engagement with the pin receiving station 60, where it is deployed for the purpose of locking the detachable hitch assembly 30 in secure mating relation internally of the hitch receiving member 50. As should be understood by reference to FIG. 4, the locking pin is received through the pin receiving station and into the channel 36 which is formed in the rectangularly shaped tow bar 31.

OPERATION

The operation of the described embodiment of the present invention is believed readily apparent and is briefly summarized at this point.

The storage apparatus for hitch and hitch torsion bars when not in use is best shown by reference to FIG. 5 wherein it is illustrated in a fully assembled and installed condition. The apparatus 10 is deployed from a supporting structure 11 where it mounts a detachable hitch assembly or hitch 30, and a pair of spring bars or hitch torsion bars 40 in secure mating relationship to prevent the removal thereof from the apparatus. As best seen by reference to FIG. 4, the apparatus, which is manufactured out of heavy gauge steel and the like, prevents the removal of the spring bars and detachable hitch assembly by locking them into a secure attitude by employing the locking pin 110, and the pivotally mounted doors 90, which deploys a locking member 96. The locking pin 110 is adapted to secure the detachable hitch assembly in secure mating relationship internally of the hitch receiving member by being received into the channel 36 formed in the rectangularly shaped tow bar 31. The channel 36 is placed into registry with the pin receiving station 60 thus permitting the locking pin to extend therethrough. It should be understood that the locking pin is thereafter secured by a suitable lock (not shown), the hasp portion of the lock being inserted through the orifice 114. The lock thus prevents the removal of the locking pin from the pin receiving station.

The spring bars or hitch torsion bars 40 are secured into slidably receiving mating engagement with the spring receiving members 70 by the pair of pivotally mounted doors 90, which are positioned and held in a closed attitude 103, when the detachable hitch assembly or hitch 30 is received in secure mating relationship internally of the hitch receiving member 50. The pair of pivotally mounted doors, when held in the closed attitude, captures the spring bars in secure mating relationship with the spring receiving members and thereafter prevents the removal of the spring bars from the spring receiving members 50 so long as the detachable hitch assembly is received in secure mating relationship with the hitch receiving member.

It should be understood, therefore, that the spring bars or hitch torsion bars 40 are first placed into engagement with the spring receiving member 70; and thereafter the pair of pivotally mounted doors 90 are moved to the closed attitude to capture them in secure mating relation. The detachable hitch assembly 30 is then slidably received interally of the hitch receiving member 50, and the locking pin 110 is moved into the pin receiving station 60, and thereafter secured by a lock, not shown, to prevent the removal of the spring bars.

Therefore, the storage apparatus for a hitch and hitch torsion bars when not in use of the present invention is adapted for installation on a wide variety of overland vehicles; operates cooperatively with a detachable hitch assembly or hitch 30 and a pair of spring bars or hitch torsion bars 40 for securing them against theft and/or damage; and can be constructed and installed at a nominal price.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A storage apparatus for a detachable hitch assembly and a pair of spring bars, the apparatus mounting the detachable hitch assembly and the pair of spring bars on a supporting structure, the apparatus comprising:

a hitch receiving member that defines a channel which is adapted to receive in fixed relation therein the detachable hitch assembly, the hitch receiving member further having an outside surface, which mounts a bracket adapted to be secured on the supporting structure, and a pin receiving station is formed in the hitch receiving member for receiving a locking pin, said locking pin adapted to secure the detachable hitch assembly in secure mating relationship internally of the hitch receiving member;

spring receiving members mounted on the outside surface adapted to receive and deploy the spring bars in a secured predetermined attitude; and a pivotally mounted door mounted in close proximity to the channel of the hitch receiving member for releasably interlocking the spring bar in secure mating engagement with the spring receiving members, said pivotally mounted doors having a locking member mounted thereon that positions the pivotally mounted door in a closed attitude when the detachable hitch assembly is received in secure mating engagement internally of the hitch receiving member to prevent the removal of the spring bars from the spring receiving members.

2. The apparatus of claim 1 wherein the spring receiving member has a lower surface which mounts a brace member of angulated configuration, said brace member positioning the spring bars in a predetermined attitude when the spring bars are received internally of the spring receiving members.

3. An apparatus for securing a hitch assembly and a pair of spring bars on a supporting structure, the apparatus comprising
 a hitch receiving member mounted on the supporting surface and conformably dimensioned to receive in secure mating relationship the hitch assembly, said hitch receiving member deploying the hitch assembly in a fixed attitude on the supporting structure;
 a plurality of spring receiving members mounted to the hitch receiving member and adapted to receive and deploy the spring bar in a predetermined attitude;
 a plurality of pivotally mounted doors affixed to the hitch receiving member, the internally mounted doors each having a locking member adapted to secure the doors in a closed attitude when the hitch assembly is received in secure mating relationship internally of the hitch receiving member; and
 a locking pin borne by the hitch receiving member for releasably interlocking the hitch assembly in secure mating relationship internally of the hitch receiving member.

4. The apparatus of claim 3 wherein the pivotally mounted doors each capture the spring bars in secure mating relationship internally of the spring receiving members when the pivotally mounted doors are positioned in a closed attitude.

5. The apparatus of claim 4 wherein the plurality of spring receiving members mounts an angulated brace having opposed ends, said opposed ends being adapted to position the spring bars in a predetermined attitude.

6. The apparatus of claim 5 wherein the plurality of pivotally mounted doors has a predetermined path of travel, the pivotally mounted doors are adapted to move from an open attitude, which permits the spring bars to be slidably received internally of the spring receiving members, to the closed attitude, which captures the spring bars in a secure mating relationship internally of the spring receiving members.

7. Apparatus for securing a pair of spring bars and a detachable hitch assembly to a supporting structure, the apparatus comprising
 A. a mount for securing and deploying the apparatus in a predetermined attitude below the supporting structure;
 B. a hitch receiving member secured to the mount and conformably dimensioned to receive in close mating relationship the detachable hitch assembly, said hitch receiving member having a longitudinal axis, opposite sides, an outside surface, forward and rearward portions, and a channel formed in the opposite sides transversely of the longitudinal axis;
 C. a pair of spring receiving members mounted on the hitch receiving member in a substantially parallel attitude to the longitudinal axis of the hitch receiving member and having a lower surface, said pair of spring receiving members individually positioned on the opposite sides of the hitch receiving member and in close proximity to the lower surface and the forward portion, said pair of spring receiving members conformably adapted to receive and deploy the pair of spring bars in a predetermined attitude;
 D. an angulated brace mounted on the lower surface of the spring receiving members for deploying the spring bars in a predetermined attitude when the spring bars are received internally of the spring receiving member;
 E. a pair of pivotally mounted doors mounted on the hitch receiving member in an attitude closely adjacent to the forward portion of the hitch receiving member and to the spring receiving members, the pivotally mounted doors adapted for substantially pivotal motion between an open and a closed attitude, said pair of pivotally mounted doors individually mounting a locking member, said locking member being operable, selectively, to deploy the pivotally mounted doors to the closed attitude; said pair of pivotally mounted doors, in the closed attitude capturing the spring bars in secure mating relationship internally of the spring receiving members; and
 F. a locking pin received in the channel for releasably interlocking the detachable hitch assembly in secure mating relationship internally of the hitch receiving member, said detachable hitch assembly when received internally of the hitch receiving member urging the pair of pivotally mounted doors to be deployed in the closed attitude thus capturing the spring bars internally of the spring receiving members.

8. A storage apparatus for a detachable hitch assembly and at least one spring bar, the storage apparatus mounted on a supporting surface comprising
 a hitch receiving member that is conformably dimensioned slidably to receive the detachable hitch assembly;
 at least one spring receiving member mounted on the hitch receiving member and adapted slidably to receive the spring bar; and
 a pivotally mounted door affixed on the hitch receiving member and adapted releasably to interlock the spring bar in secure mating engagement with the spring receiving member when the hitch assembly is slidably received in mating engagement with the hitch receiving member to prevent removal of the spring bar from the spring receiving member.

9. The storage apparatus of claim 8 wherein the pivotally mounted door has a path of travel defined between an open attitude, which permits the spring bar to be slidably received in mating engagement with the spring receiving member, and a closed attitude, which captures the spring bar in secure mating relationship therein.

10. The apparatus of claim 9 wherein an angulated brace is mounted on the spring receiving member and is operable to engage the spring bar for purposes of positioning the spring bar in a predetermined attitude.

* * * * *